US007216616B2

(12) United States Patent
Asada et al.

(10) Patent No.: US 7,216,616 B2
(45) Date of Patent: May 15, 2007

(54) ENGINE START SYSTEM AND METHOD THEREOF

(75) Inventors: Tesuya Asada, Kanagawa (JP); Takashi Eguchi, Kanagawa (JP); Junsuke Ino, Kanagawa (JP); Rei Koike, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 206 days.

(21) Appl. No.: 11/091,119

(22) Filed: Mar. 28, 2005

(65) Prior Publication Data

US 2005/0247280 A1 Nov. 10, 2005

(30) Foreign Application Priority Data

Mar. 26, 2004 (JP) ............................ 2004-091750

(51) Int. Cl.
*B60R 25/04* (2006.01)
*F02N 11/08* (2006.01)

(52) U.S. Cl. .................................. 123/179.3; 307/10.3

(58) Field of Classification Search ............ 123/179.2, 123/179.3, 179.4; 307/10.1, 10.3, 10.4, 10.5, 307/10.6, 10.7
See application file for complete search history.

(56) References Cited

U.S. PATENT DOCUMENTS

| | | | | |
|---|---|---|---|---|
| 4,653,442 | A * | 3/1987 | Swenson | 123/179.3 |
| 4,901,690 | A * | 2/1990 | Cummins et al. | 123/179.3 |
| 5,601,058 | A * | 2/1997 | Dyches et al. | 123/179.2 |
| 2002/0008494 | A1 * | 1/2002 | Nagao et al. | 318/778 |

* cited by examiner

*Primary Examiner*—Stephen K. Cronin
*Assistant Examiner*—Arnold Castro
(74) *Attorney, Agent, or Firm*—Honigman Miller Schwartz and Cohn LLP

(57) ABSTRACT

An engine-starting device for an engine. The device includes a counter that provides a counting value based on an initiation of engine cranking; and a cranking control system that prohibits engine cranking if the counting value of the counter passes a cranking prohibition threshold value.

28 Claims, 5 Drawing Sheets

ENGINE START SYSTEM AND METHOD THEREOF

CROSS-REFERENCE TO RELATED APPLICATION

This application is based on and claims the benefit of priority from Japanese Patent Application No. 2004-091750, filed on Mar. 26, 2004, the entire contents of which are incorporated herein by reference.

BACKGROUND

Some engine-starting devices utilize identification (ID) matching between portable equipment, such as an electronic key, and an electronic key controller located on the vehicle. A push-button switch to start or stop the engine may be operated while carrying the electronic key. When a registered ID, carried on one's person in the electronic key, matches the ID of the electronic key controller, the engine may be cranked to start the engine.

BRIEF SUMMARY OF THE INVENTION

An engine-starting device for an engine includes a counter that is adapted to begin counting when the engine begins cranking and a cranking control system that is adapted to prohibit engine cranking if a counting value of said counter passes a cranking prohibition threshold.

BRIEF DESCRIPTION OF THE DRAWINGS

The present invention will now be described, by way of example, with reference to the accompanying drawings, in which.

DETAILED DESCRIPTION

Figure 1:
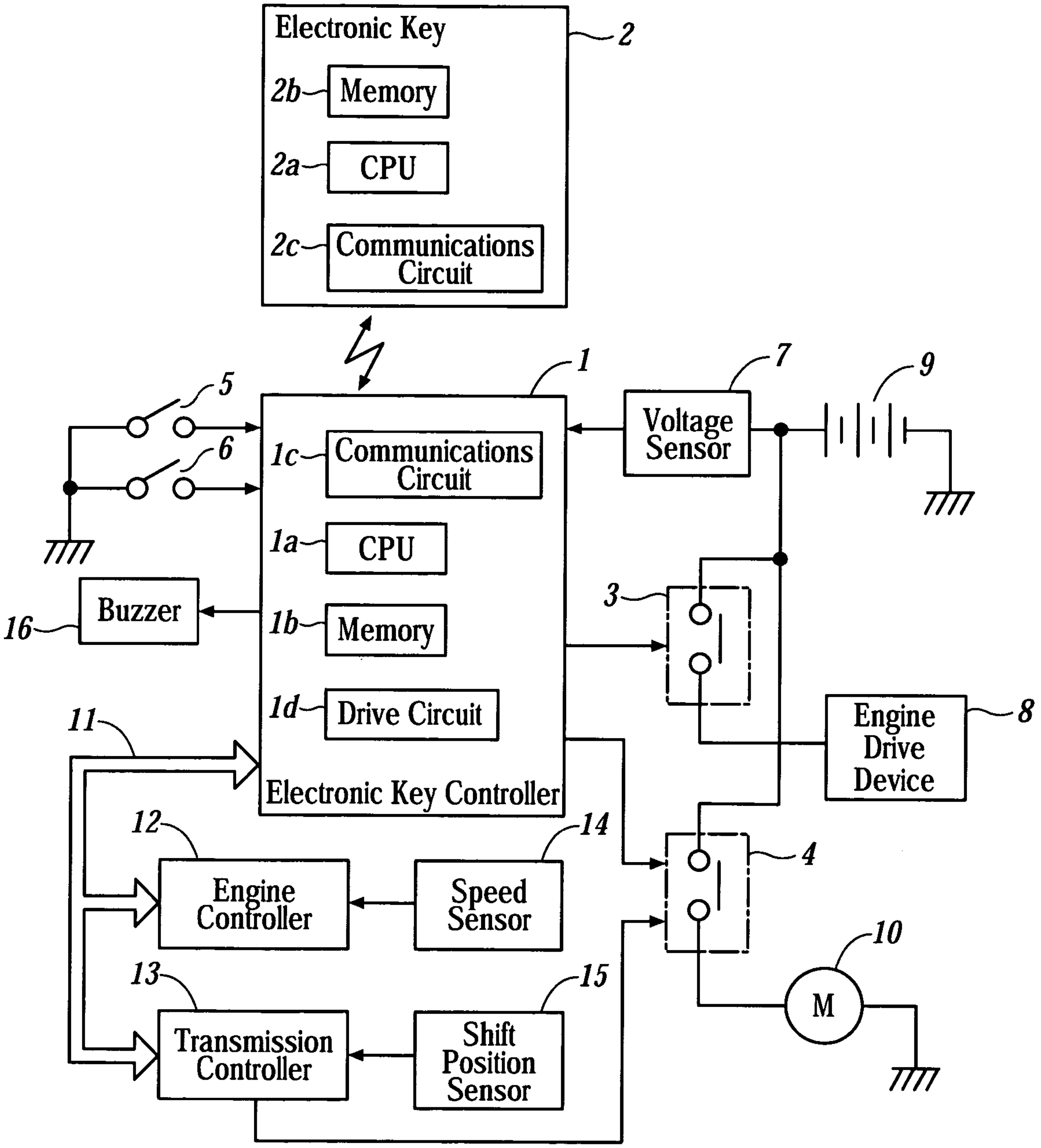
FIG. 1 is a schematic view of an engine starting device according to an embodiment of the present invention.

An embodiment of the present invention used in connection with a push-button engine-starting device to start or stop an engine will be described. However, the present invention is not limited to a push-button engine-starting device, and may also be applied to a variety of other engine-starting devices, such as, for example, ignition key systems and intelligent key systems. One skilled in the art will readily recognize other engine starting devices that may be used in connection with the embodiments of the present invention.

Ignition key systems are used in many vehicles. In such systems, an ignition key is inserted into a ignition key cylinder and turned from a locked position (LOCK) to the unlocked position. Furthermore, if the ignition key is turned to the accessory position (ACC), power is supplied to the vehicle accessory equipment. If the key is turned to the ignition ON position (IGN), power is supplied to the ignition coil. If the key is turned further in the direction of the start position (START), power is supplied to the starter motor.

Intelligent key systems eliminate the mechanical mechanism including a key plate and key cylinder from the ignition key system and, in their place, provide an ignition knob and an electronic key unit. Therefore, by carrying portable equipment such as an electronic key having a registered ID, communication can be effected with the electronic key controller (installed in vehicle) to determine whether IDs of the electronic key and electronic key controller match. When the IDs match, the vehicle doors can be locked or unlocked (door locking function) and the engine can be started and stopped (engine-starting function). Moreover, typically, key plates are not provided in the electronic keys for intelligent key systems.

In an intelligent key system, the ignition knob is pressed or actuated to activate a switch. ID matching is then carried out through communication between the electronic key and electronic key controller. If the IDs match, the ignition knob rotation or actuation lock is released, and the knob may be turned from the locked position (LOCK) to the unlocked position, accessory position (ACC), ignition on (IGN) position and start position (START). If the ignition knob is rotated from the locked position (LOCK) to the unlocked position, the steering mechanism is released. Furthermore, if the ignition knob is turned to the accessory position (ACC), power is supplied to accessory equipment. If the ignition knob is turned to the ignition ON position (IGN), power is supplied to the ignition coil. Power is supplied to the starter motor if the ignition knob is turned further toward the start position (START).

In a push-button engine-starting device, as with intelligent key systems, communication between the electronic key controller (installed in vehicle) and an electronic key carries out ID matching. A registered ID is stored on one's person by carrying the electronic key, and when the ID in the electronic key matches the ID registered in the electronic key controller, the vehicle doors can be locked or unlocked (door locking function) and the engine can be started and stopped (engine-starting function). Typically, push-button engine-starting devices are not equipped with the ignition knob as provided in intelligent key systems. Instead, these systems are equipped with a push-button switch to start or stop the engine. Furthermore, push-button engine-starting device electronic keys are not equipped with key plates. Of course, one skilled in the art will readily recognize other engine starting devices that may be used in connection with the embodiments of the present invention.

In push-button engine-starting devices, communication is carried out between the portable equipment, such as an electronic key, and controller installed in the vehicle. If the transmission shift is in park (P) or neutral (N), the brake pedal is depressed and the push-button is pressed to start or stop the engine. If the IDs match and the steering lock mechanism is released by an actuator, accessory and ignition power is available, and power is supplied to the starter motor for starting the engine. Furthermore, if the transmission shift position is returned to the park position (P) or the neutral position (N), and the switch to start or stop the engine is operated while the engine is running, the engine stops running.

When an engine is started by pressing a pushbutton switch for a short period of time when using a push-button engine-starting device, the starter motor cranks the engine for a given time period or predetermined cranking time. When engine starting is detected during this predetermined cranking time, the starter motor is stopped. However, when engine starting is not detected, the starter motor continues turning until this predetermined cranking time expires. If the driver realizes that the engine has failed to start and again operates the push-button, the cranking operation described above is repeated. For purposes of this specification, this type of cranking system will be referred to as "auto-cranking."

Conversely, if the push-button switch is operated by continuously pressing the button longer than the predetermined cranking time, the engine is cranked by the starter motor while the switch is pressed. Such cranking occurs irrespective of the predetermined cranking time for the auto-cranking operation described above. If the driver realizes that the engine is started and he releases the push-button switch, the starter motor stops and engine cranking ends. For purposes of the specification, this type of cranking system will be referred to as "manual cranking."

Therefore, if the engine does not start for some reason, the push-button switch is cranked for a set time or repeated several times in auto-cranking mode. Or, the push-button switch is continuously operated in manual cranking mode until the engine starts. Therefore, while the engine is cranked by the starter motor, the temperature of the starter motor and battery power distribution equipment/devices rises, and may reach a point where the operating parameters are exceeded. This may result in performance deterioration and damage. Thus, in one embodiment of the present invention, the engine is cranked within a permissible range based on a rating and performance of the starter motor and battery power distribution equipment/devices. Of course, one skilled in the art will readily recognize other reasons and time ranges that may be used for cranking.

Referring now to FIG. 1, an embodiment of the present invention is shown and described. The electronic key controller 1, in one embodiment installed in the vehicle, is provided with a CPU 1*a*, memory 1*b*, communications circuit 1*c*, drive circuit 1*d*. Electronic key controller 1 carries out ID matching through communication with the electronic key 2 for vehicle door locking and unlocking, engine-starting and stopping, steering locking and unlocking, power supply control for equipment installed in the vehicle and the like. The memory 1*b* stores the registered ID that permits operation of the vehicle upon a match. The drive circuit 1*d* turns the relays 3 and 4, described later, on and off (ON/OFF).

The electronic key 2 (portable equipment) is equipped with a CPU 2*a*, memory 2*b*, communications circuit 2*c*, a door lock switch, and a door unlock switch. The electronic key communicates with the electronic key controller 1, and sends the operating information for the ID and switch. The ID, specific to the electronic key, is stored in the memory 2*b*.

Relays 3 and 4, push-button switch 5 (for starting and stopping the engine), a brake switch 6 and a voltage sensor 7 are connected to the electronic key controller 1. The relay 3 is a switch for supplying electric power from a battery 9 to the engine drive device 8. The relay 4 is a switch for supplying power from the battery 9 to the starter motor 10. Moreover, engine drive devices 8 include an ignition system, fuel injection system, throttle valve drive device, and other equipment and devices for controlling the engine. Of course, one skilled in the art will readily recognize other features and configurations for the engine drive device 8. The push-button switch 5 is an operational component to start or stop the engine and, in one embodiment, is installed in the vicinity of the driver's seat. Of course, the pushbutton switch 5 may be installed at any location. The brake switch 6 is a switch that turns on (closed circuit) when a brake pedal is pressed. The voltage sensor 7 is a detector for detecting the voltage Vb of the battery 9. The starter motor 10 is an electric motor for cranking the engine.

In one embodiment, the electronic key controller 1 also carries out multiplexing communications with the engine controller 12, transmission controller 13, and the like, through an in-vehicle network (CAN: Control Area Network) communications lines 11. The engine speed is input from a speed sensor 14 through the engine controller 12, and the transmission shift position is input from a shift position sensor 15 through the transmission controller 13. Moreover, the engine controller 12 is provided with a CPU and peripheral components, that carries out engine intake air volume control (throttle valve opening control), fuel injection control, and control during ignition for adjusting the engine torque and speed. Other processes, as well, maybe contemplated by the engine controller 12. Furthermore, the transmission controller 13 controls the transmission shift position. A buzzer 16 (or other audible alarm signal) is a warning device for providing a warning when engine cranking by the starter motor is prohibited or should be stopped. Moreover, a display of text or a symbol may indicate that cranking is prohibited, or the warning may be a sound or audio broadcast from a speaker. One skilled in the art will readily recognize other means for indicating a warning.

Figure 2:
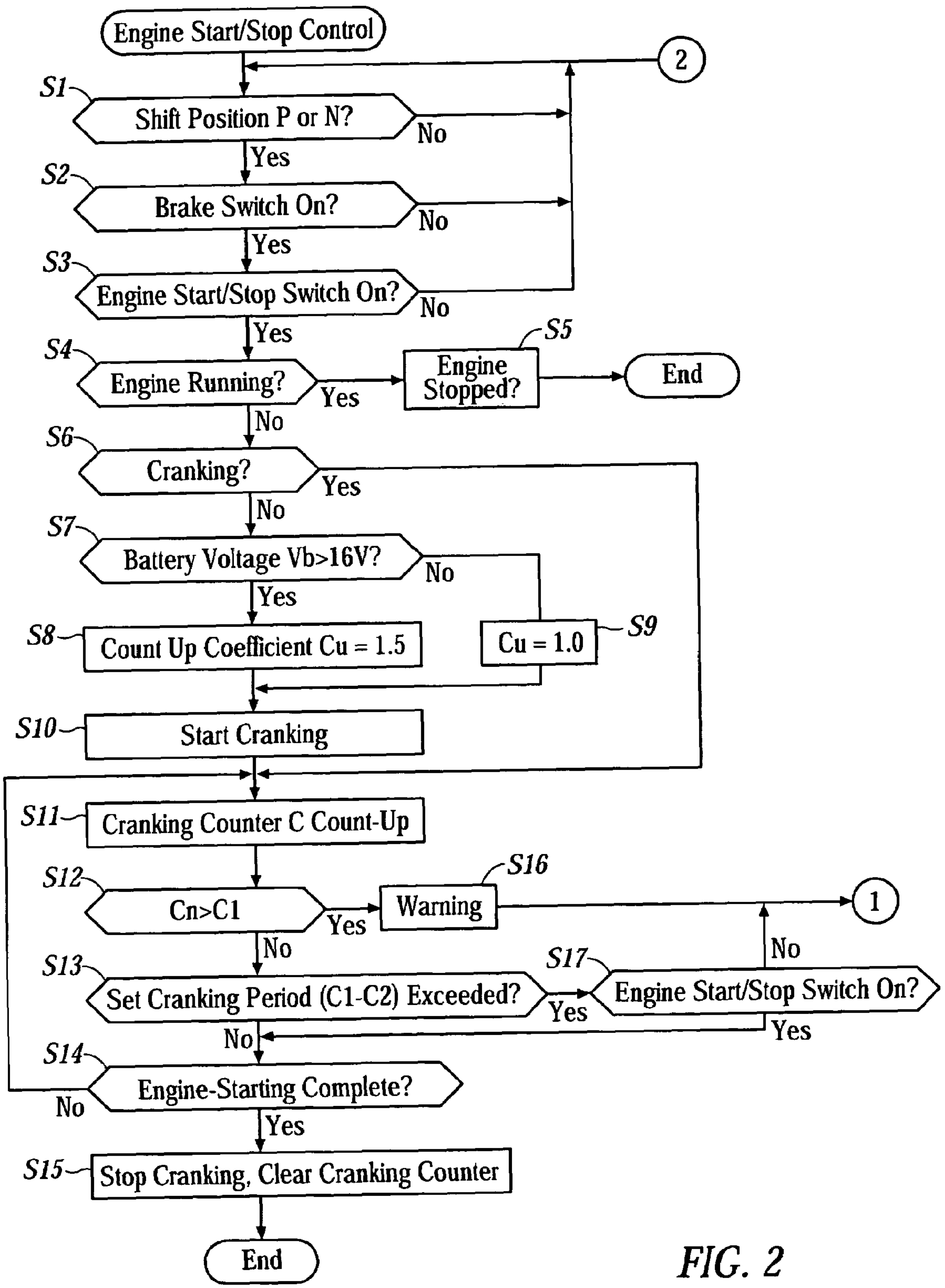
FIG. 2 is a flow chart for an engine starting device according to an embodiment of the present invention.
Figure 3:
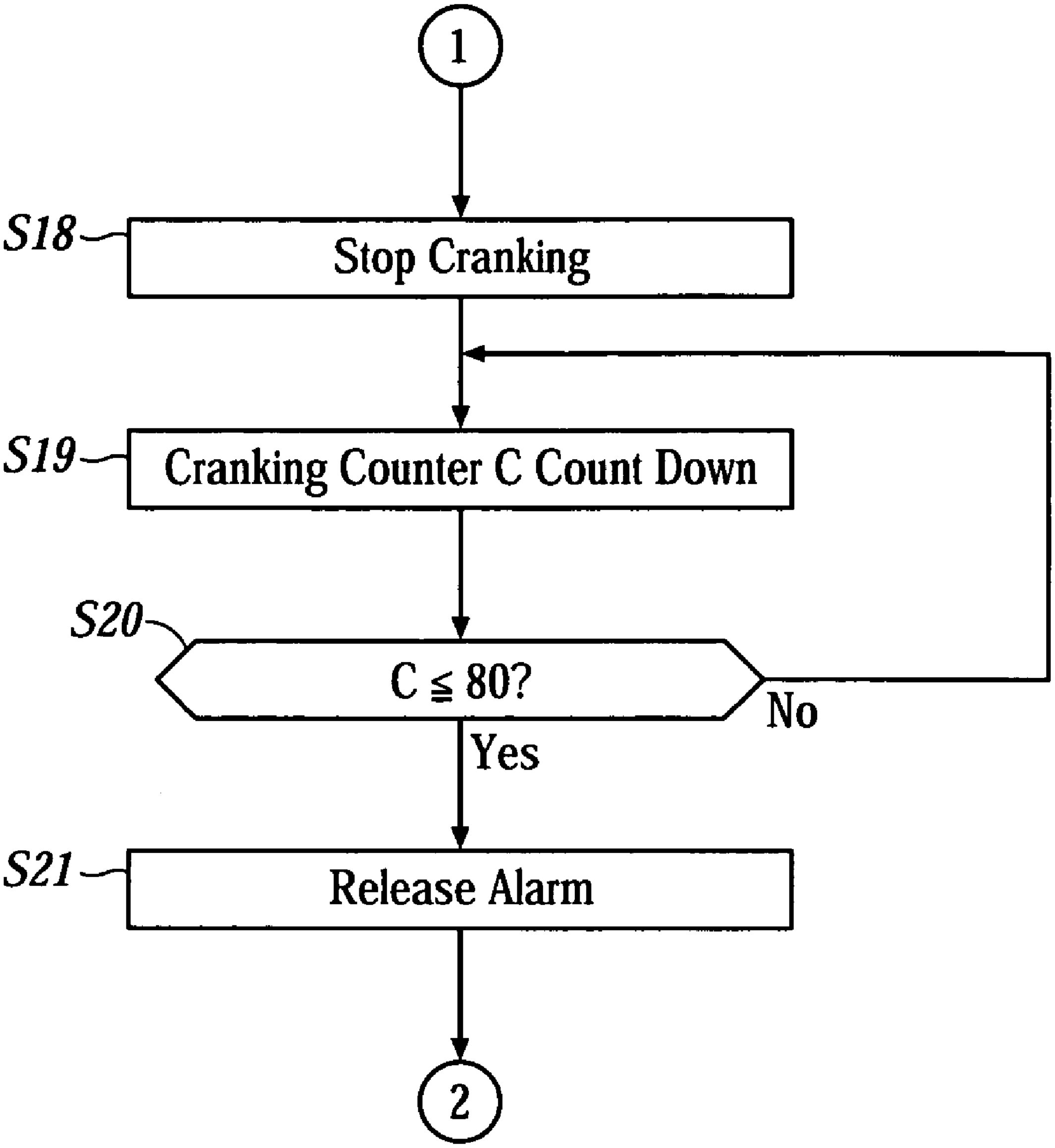
FIG. 3 is a flow chart for an engine starting device according to an embodiment of the present invention.

Referring now to FIG. 2, a flow chart showing an engine-starting and stopping control program is shown according to an embodiment of the present invention. The CPU 1*a* for the electronic key controller communicates with the electronic key 2 and checks whether the ID saved in the electronic key 2 matches the registered ID stored in the memory 1*b*. When an ID match is obtained, the CPU executes the engine-starting and stopping control program. However, one skilled in the art will readily recognize that the process of FIG. 2 may be carried out in other engine starting systems besides those that employ an electronic key and electronic key controller.

In step 1 of FIG. 2, whether the transmission shift lever is in the park position P or the neutral position N is determined. If in the parked position P or the neutral position N, the process moves to step 2. In step 2, whether the brake pedal switch 6 is on is determined. In other words, if the brake pedal is depressed or not is determined. If depressed, the process moves to step 3. In step 3, a determination is made as to whether the push-button switch 5 is pressed. In other words, a determination is made as to whether the driver has started or stopped the engine.

When the transmission shift lever is in the parked position P or the neutral position N, and when the brake pedal is depressed and the push-button switch 5 has been operated, the process moves the step 4. Step 4 determines whether the engine has been started and is running. The determination of whether the engine is running or not may include, for example, a determination that the engine is already started and running, such as when the fuel injection device and ignition device in the engine drive device 8 are running and the engine speed of the engine detected by the speed sensor 14 is at or above a given threshold speed. Here, the threshold speed for engine speed mentioned above is, for example, set to a little below idle.

When the engine is already running and the pushbutton switch 5 is operated, the process moves to step 5, and the relay 3 is turned off (open circuit). The battery power supply to the engine drive device 8 is stopped and the engine is therefore stopped. On the other hand, when the engine is not running and the pushbutton switch 5 is operated, the process moves to step 6. In step 6, a determination is made as to whether the engine is being cranked by the starter motor 10. When the engine is being cranked, steps 7 to 10 are skipped, and the process moves to step 11.

When the engine is not being cranked, the process moves to step 7 to determine whether the battery voltage Vb is greater than, for example, 16 V. Even if a battery with a rated voltage of 14 V is used, the battery voltage Vb may exceed 16 volts due to a failure in the alternator regulator. Furthermore, when power is received from a 24 V battery of a vehicle, such as a rescue vehicle, the battery voltage Vb may be approximately 18 V. When a high voltage is applied to the starter motor 10, a correspondingly high load is placed on the starter motor 10. This may cause the temperature of the starter motor 10 to rises rapidly when compared to the application of a rated voltage.

When the battery voltage Vb is greater than 16 V, the process moves to step 8, and a count-up coefficient Cu for the cranking counter C is set to 1.5. On the other hand, when the battery voltage Vb is 16 V or less, the process moves to step 9, and the count-up coefficient Cu is set to 1.0. In one embodiment, the count-up coefficient Cu for cranking counter C is determined based on the ratings and performance of the battery power supply distribution equipment, and devices such as the starter motor 10 and the relays 3 and 4. Of course, one skilled in the art will readily recognize that the count-up coefficient may be determined based on other reasons and may be other values than those disclosed above.

In step 10, after the count-up coefficient Cu has been set, the relay 3 is turned on (closed circuit), and along with supplying battery power to the engine drive device 8, the relay 4 is turned on (closed circuit) and battery power is supplied to the starter motor and engine cranking is started.

While the transmission shift lever is in the park position P or the neutral position N, an ON signal is output by the transmission controller 13. If an ON signal is output to the relay 4 from the electronic key controller 1 while in this condition, the relay 4 is turned on (closed circuit).

In step 11, the cranking counter C begins counting up. In an embodiment, the cranking counter C is an up and down software counter that starts counting from when the pushbutton switch 5 is operated and cranking first starts. The counter counts up while the engine is being cranked until engine-starting is complete. The counter then counts down while cranking is halted. However, it will be understood that counting in any known means or configuration may be used in connection with the above described embodiment. For example, counting down may be used while the engine is cranked and counting up may be used after cranking is prohibited. Likewise, counting up or counting down may be employed through the entire process. Similarly, the term counting may include means such as timing, counting crank revolutions or angular displacement, or any other known means.

The counter outputs a total count that is equivalent to the effective cranking time until the engine starts. The effective cranking time is a time span for cranking the engine that substantially affects the rating and performance for the starter motor 10 and the battery power supply distribution equipment/devices. More specifically, the effective cranking time is a time limit based on the ratings and performance for heat generation or other damage that may be caused to components of the engine. One skilled in the art will readily recognize other bases for determining the effective cranking time. When auto-cranking is carried out, where the cranking counter C or the pushbutton switch 5 is operated for a short time, the set cranking time is clocked.

In an embodiment, each time the engine is cranked, a counting equation is performed by the cranking counter C until the total count value exceeds a given threshold value C1 (set to, for example, 90 in one embodiment) or a set cranking period of time (details discussed later) has passed. For the equation, assigning Cn as the total count value for the cranking counter C during the current counting, tn as the current count time; Cn−1 as the total count value for the cranking counter C during previous cycle of the equation; and tn−1 as the counting time during previous cycle of the equation, the total count value for the current Cn is found using the equation as follows.

$$Cn=C(n-1)+Cu*(t(n)-t(n-1)) \quad \text{Eq. 1}$$

In Eq. 1, Cu is the counting coefficient set in steps 8 or 9. Even if the elapsed time (t(n)−t(n−1)) from the previous to the current cycle of the equation is the same, the counting occurs 1.5 times faster if the battery voltage Vb is higher than the preset or given value than if the battery voltage is below the preset or given value. Additionally, one skilled in the art when will recognize that the counting coefficient may be generated by other means. Of course, one skilled in the art will recognize other equations and calculating means that may be used to determine Cn, and the embodiment described above is merely one example.

Figure 4:
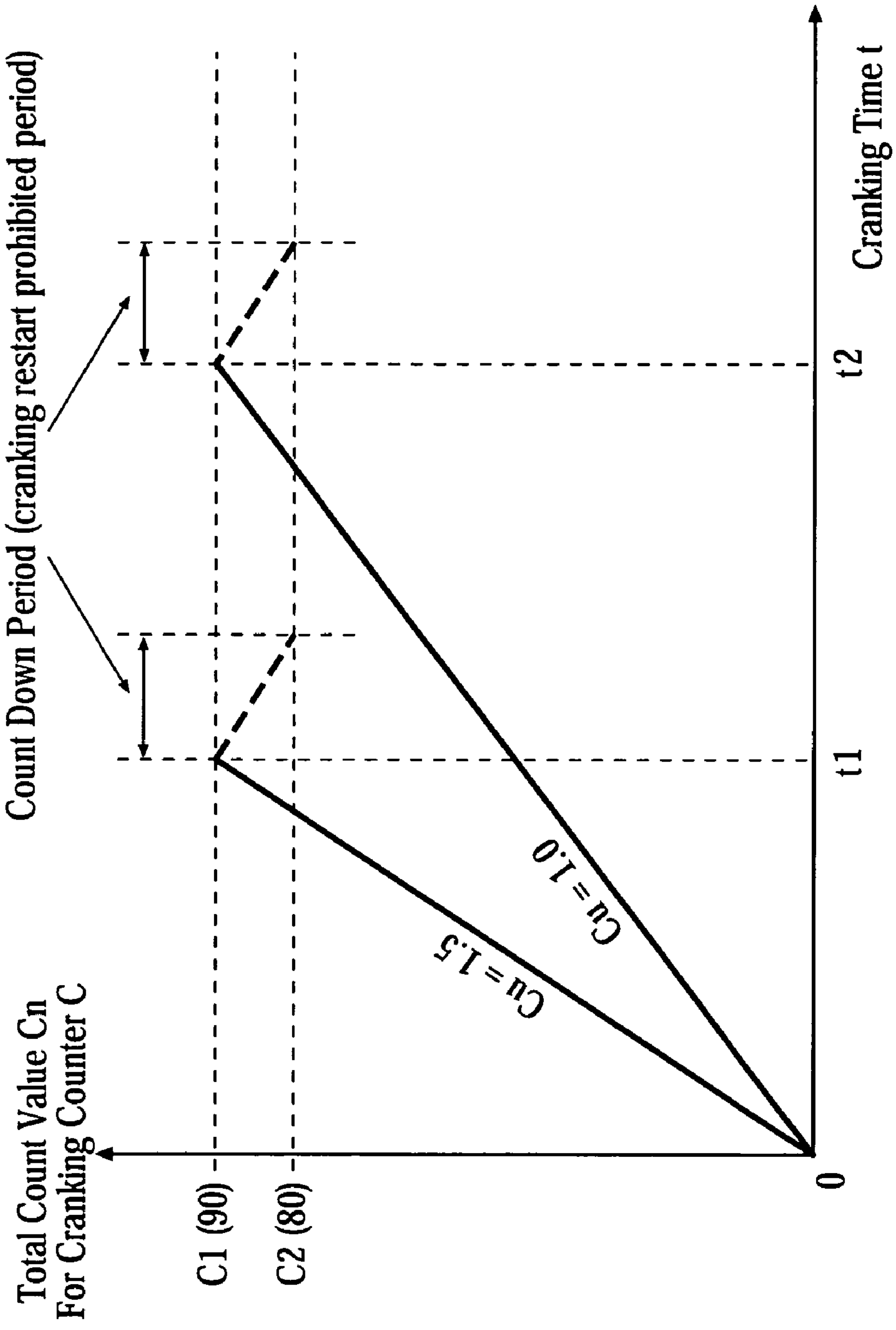
FIG. 4 is a diagrammatical view for an engine starting device according to an embodiment of the present invention.

FIG. 4 shows an embodiment of the relationship between the battery voltage Vb and the cranking time t. In one embodiment, cranking is prohibited if the total count value Cn for the cranking counter C exceeds the threshold value C1, and cranking is permitted if the total count value Cn falls to or below the threshold value C2 (for example, 80 in an embodiment). Of course, one skilled in the art will readily recognize that other values for C1 and C2 may be used. Here, the threshold value C1 for the total count value Cn prohibiting cranking, and the threshold value C2 for the total count value Cn permitting cranking are both optimized according to the ratings and performance of the starter motor 10 and the battery power supply distribution equipment/devices. Of course, the total count value Cn permitting cranking and prohibiting cranking may be optimized for any reasons.

Furthermore, the difference (C1−C2) between the threshold value C1 for the total count value Cn prohibiting cranking and the threshold value C2 for the total count value Cn permitting cranking (in one embodiment, 10) are count values corresponding to set cranking times for carrying out auto-cranking when the pushbutton switch 5 is operated. This period is referred to as the set cranking period. Moreover, the set cranking period (C1−C2) counted by the total count value Cn for the cranking counter C. The actual cranking time varies according to the counting coefficient Cu. When the total count value Cn falls to or below the threshold value C2 for permitting cranking to restart, and auto-cranking is performed, cranking is performed automatically for a count of (C1−C2). When the total count value Cn once again reaches the threshold value C1, cranking is again prohibited.

Moreover, an arbitrary value other than the difference between the threshold values C1 and C2 may be used for the set cranking period. But if a value larger than (C1−C2) is set, the total count value Cn exceeds the threshold value C1 during auto-cranking after cranking has restarted. Thus, cranking will be prohibited. Furthermore, the set cranking period may vary according to the battery voltage Vb. More specifically, the higher the battery voltage Vb, the shorter the set cranking period. This leads to a reduction in the load on the starter motor 10 and the battery power supply distribution equipment/devices.

When the battery voltage Vb is higher than 16 V, (Cu, for example, =1.5), the counting speed is greater than when the battery voltage is 16 V or less (Cu, for example, =1).

Therefore, the total cranking time t1 needed for the total count value Cn to reach the threshold value C1 is shorter than the total cranking time t2 when the battery voltage is lower than the threshold value, for example 16V or lower. As described above, the higher the battery voltage Vb, the greater the load applied to the starter motor 10 and the battery power supply distribution equipment/devices. This results in a temperature rise. Therefore, when the battery voltage Vb is high, the total cranking time is reduced. This reduces the load on the starter motor 10 and the power supply distribution equipment/devices, thereby suppressing the rise in temperature. To rephrase, the load on the starter motor 10 and the battery distribution equipment/devices can be made uniform even if the battery voltage Vb varies. This is accomplished by increasing the count-up coefficient Cu as the battery voltage Vb increases.

In step 12, whether the total current count value Cn for cranking counter C exceeds the threshold value C1 is determined, and when the total count value Cn exceeds the threshold value C1, the process moves to step 18 to stop cranking after the buzzer 16 sounds a warning in step 16. One skilled in the art will readily recognize that other warning devices besides a buzzer may be used. On the other hand, when the total count value Cn is at or below the threshold value C1, the process moves to step 13 and cranking may continue. When the total count value Cn is at or below the threshold value C1, whether the total count value Cn for the cranking counter C has counted up the set cranking period (C1–C2) is determined in step 13. More specifically, whether the set cranking period (C1–C2) has passed or is not determined. When the set cranking period (C1–C2) has passed, the process moves to step 17. When the set cranking period (C1–C2) has not passed, the process moves to step 14 and cranking may continue.

When cranking has been carried out for the set cranking period (C1–C2), whether the pushbutton switch 5 is still being operated is checked in step 17. In an embodiment of the push-button engine-starting device, there is an auto-cranking mode and a manual cranking mode. As has been described above, the auto-cranking mode allows engine cranking by the starter motor 10 when the pushbutton switch 5 is operated. More specifically, when there is a "one push operation", the auto-cranking operation is performed and the starter motor stops the cranking when the engine has started. When the engine does not start, cranking continues for the number of counts in the set cranking period (C1–C2). The cranking stops after the set cranking period (C1–C2). The operation described above is repeated if there is another one touch operation of the pushbutton switch 5.

In manual cranking mode, on the other hand, cranking by the starter motor 10 continues even if the set cranking period (C1–C2) has passed if the pushbutton switch 5 is pressed continuously. Cranking stops if the pushbutton switch 5 is released. If the engine starts during this process, cranking stops even if the pushbutton switch 5 continues to be pushed.

In step 17, if the pushbutton switch 5 continues to be operated, even though the set cranking period (C1–C2) has passed, the process moves to step 14 and cranking may continue. If operation of the pushbutton switch 5 is discontinued when the set cranking period (C1–C2) has passed, the process moves to step 18 and cranking is stopped.

When the total count value Cn for the cranking counter C is at or below the threshold value C1, and the set cranking period (C1–C2) has not been exceeded, a determination is made as to whether the engine has been started in step 14. This determination is made when the engine speed detected by the speed sensor 14 is at or above a threshold speed. Here, the threshold speed for the engine speed mentioned above is, for example, set to an engine speed a little lower than idle speed, but higher than the engine speed during cranking. Of course, one skilled in the art will readily recognize that other speeds may be used instead of that disclosed above.

When the engine has not started, the process returns to step 11, and the process is repeated while cranking continues. On the other hand, when the engine has started, the process moves to step 15, and the cranking counter C is cleared. Also, the relay 4 is turned off (open circuit) and battery power to the starter ceases and engine cranking is stopped.

In step 18, when the total count value Cn for the cranking counter C exceeds the threshold value C1 during cranking, or when the pushbutton switch 5 is released when the set cranking period (C1–C2) has passed, the relay 4 is turned off (open circuit). Also, battery power to the starter motor 10 ceases and engine cranking is stopped.

In step 19, the cranking counter C counts down. In this embodiment, cranking restart is prohibited until the total count value Cn reaches the threshold value C2 (see, for example, FIG. 4). For an equation, assigning Cn as the total count value for the cranking counter C during the count down during the current cycle of the equation; tn as the count-down time for the current cycle of the equation; Cn−1 as the total count value for the cranking counter C during the count down during the previous cycle of the equation; and tn−1 as the count down time during the previous cycle of the equation, the total count value Cn may be found based on the equation as follows.

$$Cn=Cn-1-Cd^{*}(t(n)-t(n-1)) \quad \text{Eq. 2}$$

In Eq. 2, Cd is the down-count coefficient, which is set according to the ratings and performance of the starter motor 10 and the battery power supply distribution equipment/devices. As before, Cd may be set based on other reasons. The smaller the value set for the count-down coefficient, the slower the count down speed and the count down period. More specifically, the cranking restart prohibition period becomes longer with a reduction in the count-down coefficient. Of course, one skilled in the art will recognize other equations and calculating means that may be used to determine Cn, and the embodiment described above is merely one example.

In step 20, it is determined whether the total count value Cn has counted down to the threshold value C2 or lower. If the total count value Cn reaches the threshold value C2 or lower, the process moves to step 21 and the buzzer 16 alarm is cancelled. Subsequently, the process returns to step 1, and the above-described process is repeated. On the other hand, when the total count value Cn is greater than the threshold value C2, the process returns to step 19, and the count down described above is repeated.

Figure 5:
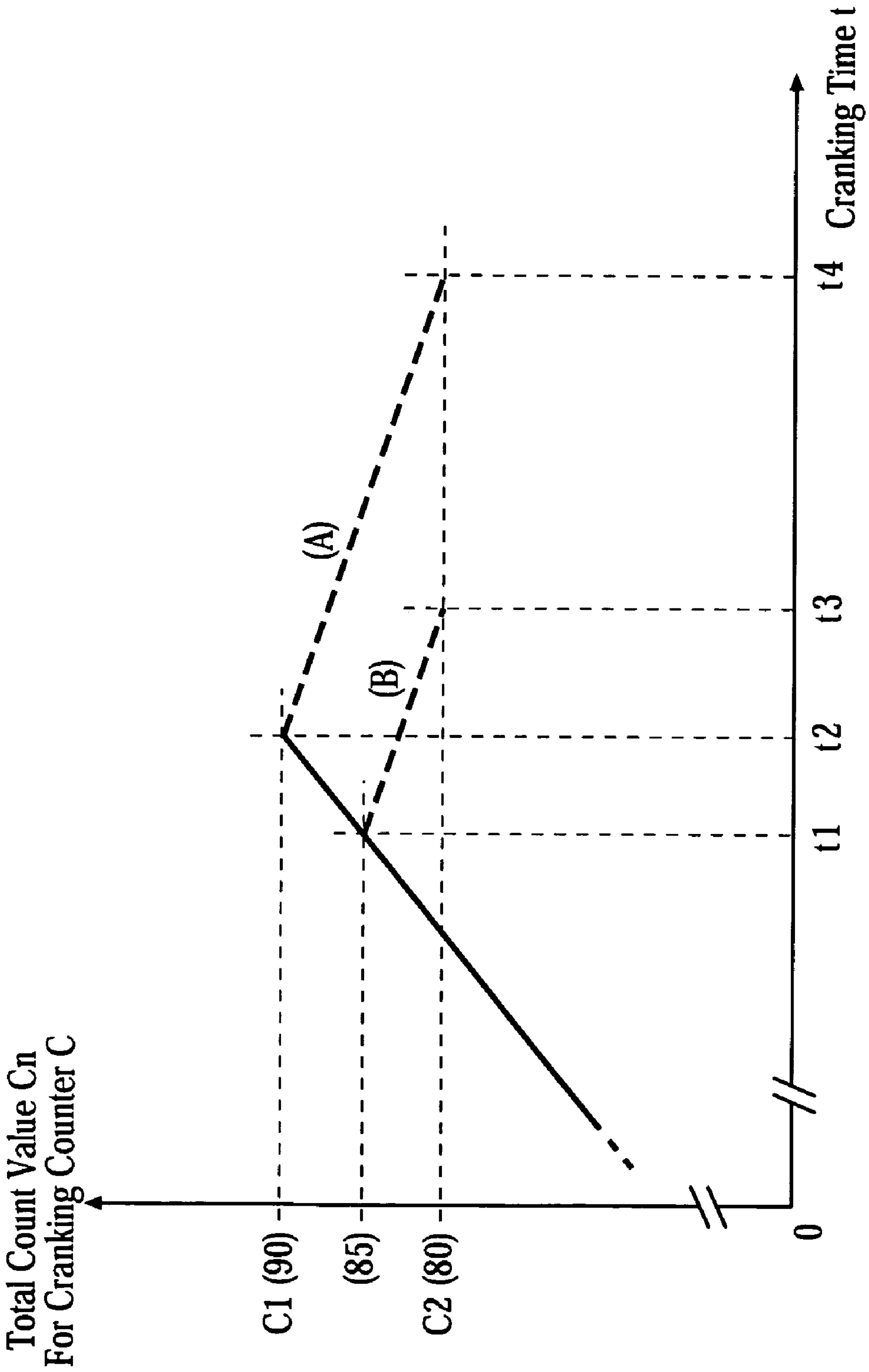
FIG. 5 is a diagrammatical view for an engine starting device according to an embodiment of the present invention.

FIG. 5 shows an embodiment of the cranking restart prohibition period when cranking is performed using manual cranking mode. When the pushbutton switch 5 is pressed continuously and cranking is performed in the manual cranking mode, cranking is prohibited at time t2 if the total count value Cn exceeds the threshold value C1. The cranking counter C counts down with the total count value Cn decreasing along the dashed line (A). The slope of this counting is set by the down-count coefficient Cd described above, and the cranking restart prohibition period (t2–t4) up to the point where the total count value Cn reaches the threshold value C2 (for example, 80) from the threshold value C1 (for example, 90) is (for example, 90−80)×Cd [sec].

On the other hand, when the total count value Cn for the cranking counter is, for example, 85 and the pushbutton switch 5 is released and cranking is ended, cranking counter C counts down and the total count value Cn falls along the dashed line (B). The slope during this counting is also set by the down-count coefficient Cd, and the cranking restart prohibition period (t1–t3) up to the point where the total count value Cn reaches the threshold value C2 (for example, 80) from the total count value Cn of 85 is (85−80)×Cd [sec].

Moreover, in an embodiment, along with setting the count-up coefficient Cu and the down-count coefficient Cd for the cranking counter C according to the battery voltage Vb, the threshold values C1 and C2 are set according to the ratings and performance of the starter motor 10 and the battery power supply distribution equipment/devices. Along with prohibiting cranking if the total count value Cn calculated by Equation (1) and Equation (2) exceeds the threshold value C1, restart of cranking is permitted if the total count value Cn is at or below the threshold value C2. One skilled of the art will readily recognized that the values C1 and C2 maybe set for any reason, including those discussed above.

In another embodiment, the effective cranking time Tk is timed, with the time when the pushbutton switch 5 is pushed and the first cranking starts to the engine start completion during cranking being timed by a timer. The time while cranking is halted is then subtracted from the added time. Furthermore, cranking is prohibited if the effective cranking time Tk exceeds a threshold value T1, and when the effective cranking time Tk is a threshold value T2 or lower, cranking restart is permitted. Furthermore, the cranking prohibition threshold value T1 and the cranking restart permitting threshold value T2, for the effective cranking time Tk described above, may be changed according to the battery voltage Vb and the ratings and performance of the starter motor and the battery power supply distribution equipment/devices. Alternatively, the effective cranking time Tk may be corrected to be longer as the battery voltage Vb becomes larger, and the cranking prohibition threshold value T1 and the cranking restart permitting threshold value T2, for the effective cranking time Tk, may be changed according to the ratings and performance of the starter motor 10 and the battery power supply distribution equipment/devices.

It will be appreciated from the foregoing that, in embodiments thereof, the invention provides an apparatus and/or method for starting an engine having a manual cranking and/or auto-cranking modes.

In an embodiment of a manual cranking mode, cranking of the engine occurs after a start switch 5 is pressed (or otherwise actuated) and continues until either the engine starts or until the count value $C_n$ of a counter C reaches or passes a predetermined threshold level $C_1$. If the engine has not started when the count value $C_n$ passes the threshold value $C_n$, cranking is stopped and the count value of the counter may be reversed. Further cranking may then be prohibited until the count value $C_n$ reaches or passes a second established or predetermined threshold level $C_2$. Thereafter, on a subsequent operation of the start switch, the cycle is repeated with cranking of the engine being stopped when the count value $C_n$ passes $C_1$ and is permitted to re-start only when $C_n$ reaches or passes $C_2$.

In an embodiment of an auto-cranking mode, cranking of the engine occurs after the start switch 5 is pressed (or otherwise actuated) momentarily and continues until either the engine starts or until a set cranking period has expired, as may be determined by the counter C. For example, in one embodiment, the set cranking period is deemed to have expired when the count value $C_n$ of the counter C has increased by an amount equal to the difference between the threshold values $C_1$ and $C_2$. If the engine has not started when the set cranking period expires, cranking is halted and the count is reversed. Thereafter, the count value $C_n$ decreases until such time as the start switch is pressed (or otherwise actuated) again. On a subsequent operation of the start switch, if the count value $C_n$ is still less than $C_1$, the engine is once more cranked until the set cranking period has expired again. In the described embodiment, the cycle is repeated until the count value $C_n$ exceeds the threshold value $C_1$. If the engine has not started when the count value $C_n$ passes $C_1$, cranking is stopped and the count is reversed. Further cranking is prohibited until the count value $C_n$ reaches or passes the second predetermined threshold level $C_2$. Thereafter, if the start switch is pressed (or otherwise actuated) again, the cycle is repeated with the engine being cranked for the set cranking period, but with cranking always being stopped when the count value $C_n$ passes $C_1$ and being permitted to re-start only when $C_n$ reaches or passes $C_2$.

By not only stopping but prohibiting re-start of engine cranking for a period of time after the count value $C_n$ exceeds the first threshold value $C_1$, the load on the starter motor and any power supply distribution equipment/devices may be reduced.

The entire contents of Japanese Patent Application 2004-091750 (filed Mar. 26, 2004) are incorporated herein by reference.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. An engine-starting device comprising:

a counter that counts up a counting value based on an initiation of engine cranking; and a cranking control system that prohibits engine cranking if the counting value of the counter passes a cranking prohibition threshold value; wherein the counter counts down the counting value when the engine cranking ends; and the cranking control system permits intermittent engine cranking until the counting value of the counter passes the cranking prohibition threshold value.

2. The engine-starting device according to claim 1, wherein:

the counter changes the counting value after engine cranking is prohibited; and the cranking control system permits engine cranking when the counting value passes a cranking restart permission threshold value.

3. The engine-starting device according to claim 2, wherein said cranking prohibition threshold value and said cranking restart permission threshold value are established based on a rated value and performance characteristic of a starter motor.

4. The engine-starting device according to claim 1, further comprising:

a battery voltage detection system that is adapted to detect a voltage of a battery that supplies power to a motor that performs said engine cranking;

wherein said cranking control system is adapted to reduce an amount of cranking to reach said cranking prohibition threshold value when the voltage of the battery meets or exceeds a given voltage value.

5. The engine-starting device according to claim 4, wherein the cranking control system is adapted to:

obtain a previous cycle time;

obtain a current cycle time;

determine a time difference between the current cycle time and the previous cycle time to provide a change in time;

multiply the change in time by a coefficient to obtain a counter change value; and add the counter change value to a counting value for the previous cycle to generate the counting value.

6. The engine-starting device according to claim 5, wherein the cranking control system reduces the amount of cranking in response to the voltage of the battery meeting or exceeding the given voltage value by increasing a value of the coefficient.

7. The engine-starting device according to claim 1, wherein a manual cranking starting system or an auto-cranking starting system performs the engine cranking.

8. The engine-starting device according to claim 1, further comprising:

a battery supplying electric power to a starter motor;

wherein the cranking prohibition threshold changes based on a voltage of the battery.

9. The engine-starting device according to claim 1, further comprising a starting completion determination system that is adapted to determine when the engine is started; wherein the starting completion determination system prohibits cranking after the engine is started.

10. The engine-starting device according to claim 1, further comprising:

a starting system for performing engine cranking;

an intelligent key controller; and an electronic key;

wherein the starting system is adapted to permit engine cranking when the intelligent key controller is within a specified distance from the electronic key.

11. The engine-starting device according to claim 1, wherein the engine starting system comprises a push-button starting system.

12. The engine-starting device according to claim 1, further comprising an alarm adapted to provide a warning when the cranking control system prohibits engine cranking.

13. The engine-starting device according to claim 12, wherein the alarm includes a buzzer or other audible alarm signal.

14. A method for starting an engine, comprising:

initiating counting of a counting value when the engine begins cranking; and prohibiting engine cranking if the counting value passes a cranking prohibition threshold value; wherein the counting value counts down when the engine cranking ends; and permitting intermittent engine cranking until the counting value passes a cranking prohibition threshold value.

15. The method according to claim 14, further comprising:

changing the counting value when engine cranking is prohibited; and permitting engine cranking when the counting value passes a cranking restart permission threshold value.

16. The method according to claim 15, wherein the cranking prohibition threshold value and the cranking restart permission threshold value are established based on a rated value and performance characteristic of a starter motor.

17. The method according to claim 14, further comprising:

detecting a voltage of a battery that supplies power to a starter motor, and reducing an amount of cranking to reach said cranking prohibition threshold value when the voltage of the battery meets or exceeds a given voltage value.

18. The method according to claim 17, further comprising:

distinguishing a previous cycle and a current cycle;

obtaining a previous cycle time;

obtaining a current cycle time;

determining a time difference between the current cycle time and the previous cycle time to provide a change in time;

multiplying the change in time by a coefficient to obtain a counter change value; and adding the counter change value to a counting value for the previous cycle to generate the counting value.

19. A method according to claim 14, further comprising incorporating a push-button to start a motor that performs engine cranking.

20. An engine-starting device comprising, a means for providing a counting value based on initiation of engine cranking; and a means for controlling engine cranking if a counting value passes a cranking prohibition threshold value; wherein the means for providing a counting value counts down the counting value when the engine cranking ends; and the means for controlling engine cranking permits intermittent engine cranking until the counting value of the counter passes the cranking prohibition threshold value.

21. The engine-starting device according to claim 20, wherein:

the counting value is changed after engine cranking is prohibited; and engine cranking is permitted when the counting value passes a cranking restart permission threshold value.

22. The engine-starting device according to claim 21, further comprising:

a means for reducing an amount of cranking before reaching the cranking prohibition threshold value.

23. The engine-starting device according to claim 22, wherein the means for reducing includes a coefficient that changes relative to a battery voltage, multiplying the coefficient by a change in time to obtain a counter change value, and using the counter change value to generate the counting value.

24. The engine-starting device according to claim 20, further comprising a means for starting engine cranking.

25. An engine-starting device comprising:

a counter that counts up a counting value based on an initiation of engine cranking;

a cranking control system that prohibits engine cranking if the counting value of the counter passes a cranking prohibition threshold value;

a battery voltage detection system that is adapted to detect a voltage of a battery that supplies power to a motor that performs said engine cranking;

wherein said cranking control system is adapted to reduce an amount of cranking to reach said cranking prohibition threshold value when the voltage of the battery meets or exceeds a given voltage value.

26. An engine-starting device comprising:

a counter that counts up a counting value based on an initiation of engine cranking; and a cranking control system that prohibits engine cranking if the counting value of the counter passes a cranking prohibition threshold value;

a battery supplying electric power to a starter motor;

wherein the cranking prohibition threshold changes based on a voltage of the battery.

27. An engine-starting device comprising:

a counter that counts up a counting value based on an initiation of engine cranking;

a cranking control system that prohibits engine cranking if the counting value of the counter passes a cranking prohibition threshold value;

a starting system for performing engine cranking;

an intelligent key controller; and an electronic key;

wherein the starting system is adapted to permit engine cranking when the intelligent key controller is within a specified distance from the electronic key.

28. A method for starting an engine, comprising:

initiating counting of a counting value when the engine begins cranking;

prohibiting engine cranking if the counting value passes a cranking prohibition threshold value;

detecting a voltage of a battery that supplies power to a starter motor, and reducing an amount of cranking to reach said cranking prohibition threshold value when the voltage of the battery meets or exceeds a given voltage value.

* * * * *